Patented Oct. 29, 1946

2,410,267

UNITED STATES PATENT OFFICE 2,410,267

CARBOTHERMIC MAGNESIA

Alva C. Byrns, Los Altos, Calif., assignor to The Permanente Metals Corporation, Oakland, Calif., a corporation of Delaware No Drawing. Application November 27, 1944, Serial No. 565,423

8 Claims. (Cl. 106—306)

This invention relates to a product, and process for preparing the same, for use in the manufacture of synthetic rubber, particularly neoprene.

Specifically the invention relates to the preparation of nitrogen-free carbothermic magnesia and is an improvement on the copending application Ser. No. 527,347, filed March 29, 1944, entitled "Product and process for manufacturing rubber," and relating to the preparation of carbothermic magnesia and its use in compounding rubber.

In the preparation of manufactured rubber, or it may be said, of manufactured rubber goods, for example, tires, footwear, or mechanical goods such as insulation, gaskets or the like, it is necessary to modify the properties of the starting material, which may be rubber or synthetic elastomer, or to impart new properties thereto. In the production of rubbers having the most desirable characteristics for certain uses, it has long been the practice to add certain types of carbons, zinc oxides, magnesium oxides, organic accelerators and the like in the compounding of the rubber. The best methods for adding these various ingredients and the proper types of ingredients for addition to various rubbers have been the subject of considerable investigation. As one instance, a great deal of attention has been given to the proper magnesia addition and numerous products and methods have been devised in order to get the desired degree of dispersion of magnesia in rubbers and to get the maximum beneficial effects from the magnesia added. For example it has been the experience in the neoprene field that it is necessary to add, in compounding, a magnesia which has a high specific surface. The disadvantage has also been encountered, however, that the greater the degree of subdivision of the magnesia, the quicker it will hydrate and this undesirable feature has led to difficulties in handling.

According to the above mentioned copending application it has been discovered that the properties of the rubber starting materials are favorably affected by compounding the starting material with a magnesia and carbon containing product known as "carbothermic magnesia" which is obtained by the reaction of magnesium with a carbon oxide to give MgO and carbon or as a residue from the distillation of the crude magnesium condensate produced in the carbothermic process for making magnesium as will be described more fully below. My process of compounding by the addition of the aforesaid magnesia and carbon containing product is especially advantageous in the working-up of synthetic elastomers, and, of the latter, exhibits peculiar advantages in the case of neoprene.

Carbothermic magnesia effective in the compounding of rubbers can be produced by reacting magnesium with an oxide of carbon in the vapor state. This proceeds under conditions which produce rapid formation and deposition of solid products of reaction, whereby extremely small particles of MgO are formed. These particles have a carbon surface deposition thereon, the carbon being bonded to the MgO, or are at least co-deposited with carbon which is also in a very high state of subdivision. In making this product, magnesium in the vapor state is reacted with an oxide of carbon such as carbon monoxide or carbon dioxide. For example, magnesium can be vaporized and, while in the vapor state, treated with a stream of carbon monoxide or carbon dioxide, to yield the desired product. In the case of carbon monoxide, the reaction may be expressed as follows:

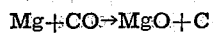

$$Mg + CO \rightarrow MgO + C$$

and in the case of carbon dioxide, the reaction may proceed stepwise, first reducing the dioxide to the monoxide and then to carbon or it may proceed more directly, but the final product will contain magnesia and carbon as described.

Carbothermic magnesia effective in the compounding of rubbers can also be obtained, for example, as a result of the manufacture of magnesium by the so-called carbothermic process. In the carbothermic process, magnesium oxide or other suitable magnesium compound and a carbonaceous reducing agent such as coke are reacted in an electric furnace at a suitably high temperature, preferably around 2000° C., to yield magnesium and CO, according to the following equation:

$$MgO + C \rightleftharpoons Mg + CO$$

This process has been described by Hansgirg in U. S. 1,884,993 and 1,943,601, and by others. As indicated, this reaction is reversible. It is displaced toward the right by high temperatures and thus is forwarded by the indicated high temperature of reaction. As the vaporous products of reaction pass out of the reaction zone they are chilled as rapidly as possible in a stream of an inert quench gas to condense the Mg as a solid and to reduce the tendency of the reaction to reverse towards the left, or to back-react. Even with such precautions, some of the Mg is back-reacted with the CO to give MgO and carbon.

Thus, the crude condensate from this reaction contains metallic magnesium, MgO, carbon, and small amounts of other compounds such as carbides and nitrides, the latter arising from reaction of the magnesium, for instance, with the nitrogen used in cooling the glands at the site of exit from the furnace, or reaction zone, or from traces of nitrogen present in the quenching gas. The condensate also contains whatever concomitant materials in the furnace feed are carried over in the reaction, such as unreacted MgO and C, CaO and the like. This crude condensate now goes to a distillation zone where the Mg is vaporized off and the other materials are left behind as a product containing magnesia (MgO), carbon and small amounts of other substances as described above.

It is a characteristic of the product obtained by the back-reaction of Mg and CO that the particle size thereof is extremely small, and it furthermore appears that the particles consist of an MgO nucleus upon which a carbon surface deposition is rather firmly bonded. Microscopic investigation has shown that the predominant particle size is below one micron in diameter in the back-reacted material. However, since larger particles of unreacted MgO and C, as well as other substances in larger particles, are also found in the crude condensate and therefore in the distillation residue, it is usually found to be advantageous to grind the distillation residue and air classify the ground material so that it preferably passes through a 325 mesh screen. This sizing, of course, relates only to the largest particles of any type found in the distillation residue. The characteristics of the particles formed by the back-reaction are not changed or lost by the operations, such as pelleting or impasting, incidental to the distillation of the magnesium from the crude condensate. The grinding and air classification are effective in breaking up grit, or accompanying materials as described above, and in breaking down the extraneous bonding effect which had been produced in the pelleting or impasting, thereby restoring the discrete particles to their original state. The product is black in color.

It is believed that the compounding of rubbers with carbothermic magnesia owes its advantages in some measure to the extremely small particle size of the magnesia, not obtainable by the usual methods of milling, grinding or the like. Carbothermic magnesia tends to be less hygroscopic, and is more effective than other known magnesia products when compared by weight in the compounding of rubbers. Furthermore, it is believed that the carbon present is important in promoting dispersion and in reducing the tendency to hydrate.

Carbothermic magnesia, particularly that obtained as a residue of the distillation step for the production of metallic magnesium as according to the above enumerated Hansgirg patents contains certain nitrogen compounds, such as magnesium nitride, which yield ammonia in the compounding operation and which may be of advantage under certain conditions. On the other hand, nitrides and other nitrogen yielding compounds are disadvantageous in certain operations because upon the formation of ammonia premature aging or curing of the milled rubber stock sets in necessitating immediate fabrication and preventing storage of portions of milled batches of any substantial period of time without curing.

The objectionable nitrogen compounds are generally formed from the nitrogen which occurs as an impurity in the oxide of carbon used in the preparation of the raw carbothermic magnesia, or as in the case of the residue of the distillation step of the carbothermic process, by reaction with the nitrogen which may comprise a substantial amount of either the flushing gases or the cooling gases used in the furnace where the material to be distilled is prepared. The nitrogen compounds generally comprise magnesium nitrides which are hydrolyzed upon contact with the water present in the rubber mixes to be compounded giving rise to ammonia.

It is an object of the present invention to provide a substantially nitrogen-free carbothermic magnesia and a process of preparing the same.

It is another object of the invention to provide a product which is suitable for use as an accelerator or pigment in rubber, particularly neoprene grades.

In the practice of the present invention the nitrogen compounds of the raw carbothermic magnesia are substantially completely removed by hydration of the magnesia contained therein, drying and calcining the resultant material, and then grinding, all under controlled conditions.

The hydration step may be carried out in several ways. Effective methods comprise submersion in water, or spraying with water, or treating with water vapor. However, regardless of the method employed, the treatment should be conducted in such a manner and for such a length of time until the magnesia is substantially completely hydrated and the ammonia producing compounds are completely reacted. Obviously, the concentration of the ammonia producing substances controls the length of the water treatment. The amount of water used in effecting hydration by the submersion method should be in excess of that stoichiometrically required, and the amount used in the spray method is preferably 50 to 100 per cent of the quantity of carbothermic magnesia treated. Considerable heat of reaction is developed in this hydration step and in any event the quantity of water added should be sufficient to compensate for the resultant vaporization.

Raw carbothermic magnesia, particularly as produced in the distillation step of the carbothermic process, is generally contaminated with traces of calcium carbide and magnesium carbide as well as sulfur. The acetylene which is produced from the reaction of the carbides, and the sulfur odors are both objectionable in rubber compounding. However, the hydration step of the invention is effective in removing these constituents as well as the nitrogen-containing compounds.

The hydrated carbothermic magnesia is dried and calcined to remove the combined water. This treatment may be carried out in air or in an inert atmosphere, although a reducing atmosphere is preferred for calcining. The pressure is not critical and atmospheric pressure is preferable. The temperature of the drying and calcining treatment may vary within the range of 1000 to 1500° F. Obviously, the time required for drying and calcining will be less at the elevated temperatures.

The carbothermic magnesia that has been thus treated, i. e. hydrated followed by drying and calcining, is next cooled by dry air or inert gases to a temperature at which it may be safely ground (450° F. or under). The material may then be ground and air classified until less than one per cent remains on a 325 mesh screen. The latter step is advantageously carried out in an atmosphere of inert gases or dry air.

The concentration of nitrogen compounds, generally Mg₃N₂, in raw carbothermic magnesia as recovered from the residue of the distillation step of the carbothermic process for the production of metallic magnesium varies, but is generally on the order of approximately 0.5 per cent calculated as equivalent NH₃. On the other hand the product obtained by the process of the invention is substantially completely free of nitrogen compounds, and if any is present the amount will be insufficient to be objectionable in rubber compounding, that is on the order of less than .01 to .03%.

Having described the product of the invention and methods for its preparation, an example thereof and an illustration of the improved results obtained by compounding in rubber will now be described.

A 13.2 lb. sample of raw carbothermic magnesia occurring as a residue of the carbothermic process for the production of metallic magnesium and having an ammonia content of 0.54 per cent was soaked in an equal weight of water until the magnesia thereof became completely reacted. Thereafter, the material was heated gently for several hours to remove most of the excess moisture present. The partially dried hydrated sample was calcined in a retort at a temperature of 1000° F. for a period of one and one-half hours after having been gradually brought up to that temperature. The calcined product was cooled in dried air, pulverized, in a disc pulverizer, ground in a hammer mill, and air separated. The recovered material had an ammonia content of less than 0.01 per cent.

The table below illustrates the marked difference in curing time between neoprene stock containing raw carbothermic magnesia (sample A) and neoprene stock similar in all respects except that it contains carbothermic magnesia (sample B) treated in accordance with the invention.

*Table*

| Min. | A | B |
|---|---|---|
| 1 | 38.0 | 39.0 |
| 5 | 31.0 | 31.5 |
| 10 | 29.0 | 32.0 |
| 15 | 32.5 | 37.5 |
| 20 | 36.5 | 39.5 |
| 25 | 40.5 | 37.0 |
| 30 | 46.0 | 38.5 |
| 35 | ¹48.0 | 39.0 |
| 40 | ------ | 40.5 |
| 45 | ------ | 41.0 |
| 50 | ------ | 42.5 |
| 55 | ------ | 44.0 |
| 60 | ------ | 45.5 |
| 65 | ------ | ²46.0 |

¹ 33 min.
² 61 min.

The figures in the table were recorded in a Mooney plastometer where the temperature of the plastometer was 220° F. and the first reading was taken after a one minute warmup.

It has also been demonstrated that neoprene stocks similar to sample B identified in the table give improved tensile strength at break and elongation at break while hardness is satisfactory, as compared with sample A.

The surface activity of the product of the invention may be rather high due to the extremely small particle size. One evidence of this surface activity is that the product tends to hydrate rapidly in a moist atmosphere. The rate of hydration may be greatly decreased by surface treating the carbothermic magnesia with a water repellant agent of the saturated fatty acid type such as stearic acid.

Having now described the invention what is claimed is:

1. The process of claim 3 wherein the drying and calcining is carried out in an atmosphere of dry air.

2. The process of claim 3 wherein the drying and calcining is carried out in a reducing atmosphere.

3. A process for the removal of nitrogen from carbothermic magnesia including magnesium nitride as impurity, said magnesia being obtained in the carbothermic process for making magnesium metal wherein nitrogen gas is present and available for reaction with the condensing magnesium, which comprises treating said carbothermic magnesia with water until the magnesium nitride contained therein is substantially completely hydrolyzed to produce ammonia, drying and driving off ammonia, and calcining the so-treated material.

4. A process for removing nitrogen from carbothermic magnesia including magnesium nitride as impurity, said magnesia being obtained in the carbothermic process for making magnesium metal wherein nitrogen gas is present and available for reaction with the condensing magnesium, which comprises soaking said magnesia in water until the magnesium nitride contained therein is substantially completely hydrolyzed to produce ammonia, and drying and driving off ammonia, and calcining said carbothermic magnesia.

5. A process for removing nitrogen from carbothermic magnesia including magnesium nitride as impurity to render it suitable for use in compounding synthetic rubber, said magnesia being obtained in the carbothermic process for making magnesium metal wherein nitrogen gas is present and available for reaction with the condensing magnesium, which comprises treating said magnesia with water until the magnesium nitride contained therein is substantially completely hydrolyzed to produce ammonia, drying and driving off ammonia, and calcining said dried material, and thereafter grinding said dried and calcined carbothermic magnesia until a majority of the particles thereof will pass through a 325 mesh screen.

6. A process for making nitrogen-free carbothermic magnesia of lowered hygroscopicity and for use in compounding synthetic rubber from carbothermic magnesia including magnesium nitride as impurity, said starting magnesia being obtained in the carbothermic process for making magnesium metal wherein nitrogen gas is present and available for reaction with the condensing magnesium, which comprises treating said starting magnesia with water until the magnesium nitride contained therein is substantially completely hydrolyzed to produce ammonia, drying and driving off ammonia, and calcining said treated magnesia, grinding said dried and calcined carbothermic magnesia until a majority of the particles thereof will pass through a 325 mesh screen, and surface treating said carbothermic magnesia with a saturated fatty acid.

7. As a new composition of matter, carbothermic magnesia, said magnesia having been obtained in the carbothermic process for making magnesium metal wherein nitrogen gas is present and available for reaction with the condensing magnesium to form magnesium nitride, which has been treated to substantially completely hydrolyze the magnesium nitride contained therein to produce ammonia, dried to drive off ammonia, and calcined.

8. As a new composition of matter, carbothermic magnesia, said magnesia having been obtained in the carbothermic process for making magnesium metal wherein nitrogen gas is present and available for reaction with the condensing magnesium to form magnesium nitride, which has been treated to substantially completely hydrolyze the magnesium nitride contained therein to produce ammonia, dried to drive off ammonia, and calcined, said dried and calcined magnesia having a surface-protective coating of saturated fatty acid.

ALVA C. BYRNS.